United States Patent [19]
Carter

[11] Patent Number: 5,785,381
[45] Date of Patent: Jul. 28, 1998

[54] SEAT PROTECTOR

[76] Inventor: Delcher Carter, 131 1st Ave. North, Jacksonville Beach, Fla. 32250-6912

[21] Appl. No.: 829,361

[22] Filed: Apr. 2, 1997

[51] Int. Cl.⁶ .................................................. A47C 31/11
[52] U.S. Cl. .............................. 297/219.1; 297/228.12; 297/DIG. 6
[58] Field of Search ..................... 297/219.1, 228.11, 297/228.12, 284.5, 284.7, DIG. 6

[56] References Cited

U.S. PATENT DOCUMENTS

| | | |
|---|---|---|
| 2,027,976 | 1/1936 | Wittcoff . |
| 2,689,604 | 9/1954 | Hourruitiner . |
| 3,279,849 | 10/1966 | Radke et al. ................. 297/284.5 |
| 3,578,383 | 5/1971 | Farl ............................. 297/DIG. 6 |
| 4,093,307 | 6/1978 | McLennan . |
| 4,597,386 | 7/1986 | Goldstein ..................... 297/284.5 |
| 4,723,814 | 2/1988 | Hunt . |
| 4,969,683 | 11/1990 | Wallace et al. . |
| 5,023,125 | 6/1991 | Grass ............................ 297/DIG. 6 |
| 5,403,066 | 4/1995 | Drum . |
| 5,426,801 | 6/1995 | Klearman et al. ............. 297/467 |

FOREIGN PATENT DOCUMENTS 2516528  10/1976  Germany ........................ 297/219.1

*Primary Examiner*—Peter R. Brown
*Attorney, Agent, or Firm*—Michael I. Kroll

[57] ABSTRACT

A seat protector (10) for a driver's eat (12) in a motor vehicle (14) comprising a flexible sheet (16) to fit against a lower portion of a backrest (18) of the driver's seat (12) in the motor vehicle (14). A structure (20) is for installing and adjusting the flexible sheet (16) against the lower portion of the backrest (18) of the driver's seat (12), so as to protect the backrest (18) from excessive use and wear by a person (22) wearing a utility belt (24) with specialized equipment (26) sitting in the driver's seat (12).

4 Claims, 5 Drawing Sheets

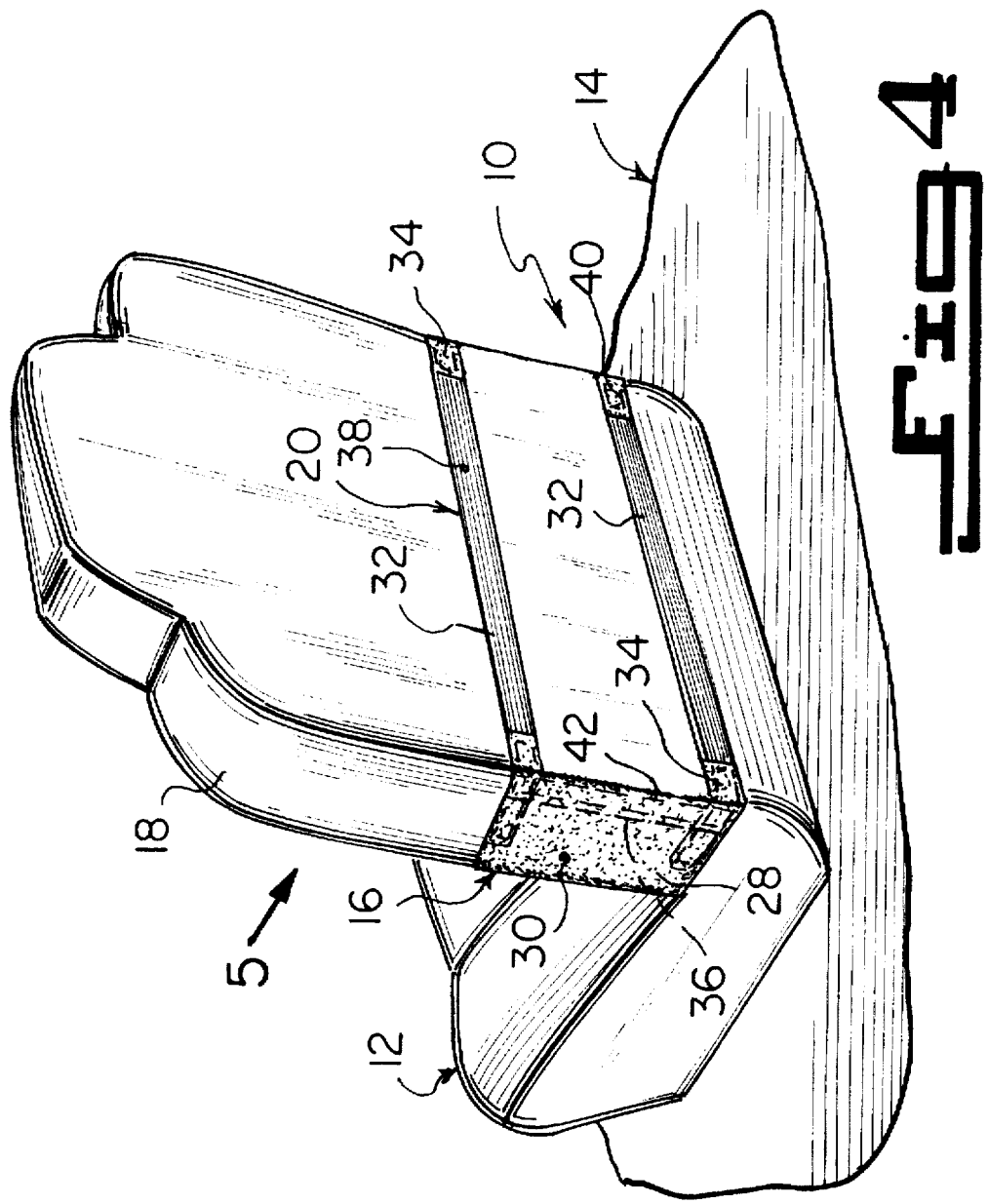

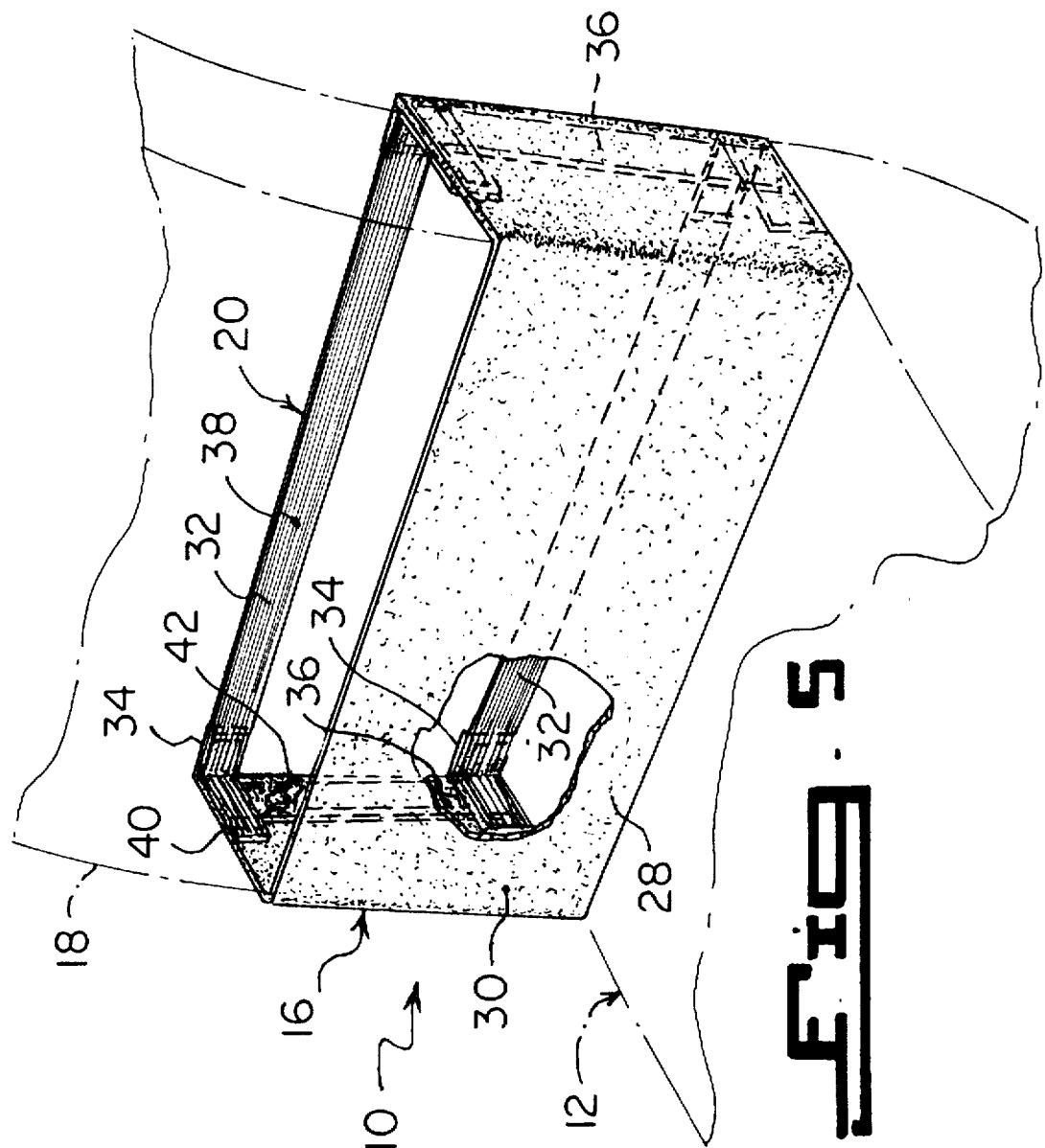

SEAT PROTECTOR

BACKGROUND OF THE INVENTION

1. Field of the Invention

The instant invention relates generally to seat covers, belts and protectors and more specifically it relates to a seat protector. The seat protector is secured to a backrest of a driver's seat in a motor vehicle from excessive use and wear.

2. Description of the Prior Art

Numerous seat covers, belts and protectors have been provided in prior art. For example, U.S. Pat. Nos. 2,027,947 to Wittcoff; 2,689,604 to Hourruitiner; 4,093,307 to McLennan; 4,723,814 to Hunt; 4,969,683 to Wallace et al. and 5,403,066 to Drum all are illustrative of such prior art. While these units may be suitable for the particular purpose to which they address, they would not be as suitable for the purposes of the present invention as heretofore described.

WITTCOFF, EDWARD

SEAT COVER

U.S. Pat. No. 2,027,947

A seat cover comprising a section of flexible and pliable material having approximately the same area as the area of the surface to which it is to be applied. A flexible and pliable frames encloses and attaches to the margin of the section. A strip extends longitudinally of and is attached to that side of the section that is concealed when the cover is in use. Transverse strips are attached to the concealed side of the ends of the section and to the ends of the longitudinal strip. A flexible and pliable section is attached to each end of the first section and to the transverse strips and the frame and is adapted to extend across the ends of the seat member to which the first section is applied. A transverse stiffener is attached to the outer end of each of the last named sections and prevents the same from folding.

HOURRUITINER, RAMON

SAFETY BELT FOR AUTOMOBILES

U.S. Pat. No. 2,689,604

A safety belt for automobiles comprising a pair of rigidly constituted, U-shaped yokes facing one another. Each yoke is formed with a straight bight adapted to extend across a side surface of an automobile seat back. Straight, elongated legs extending from the bight at right angles thereto and are adapted to overlie the front and rear surfaces, respectively, of the seat back. Flexible front and rear straps are adapted for adjustment as to their lengths. Each strap is connected at its ends to, and extend between, corresponding legs of the yokes so as to hold the yokes in embracing relationship to the sides of the seat back. Eyes project outwardly from the respective bights. A flexible body strap member is substantially greater in length than the distance between the bights and extends in front of the yokes and straps from one to the other of the yoke bights, thereby to hold a vehicle passenger against excessive movement away from the seat back. Clasp elements on the ends of the body strap member releasably engage the eyes to hold the body strap member assembled with the yokes.

McLENNAN, RONALD A.

VEHICLE RESTRAINING BELT STRUCTURE

U.S. Pat. No. 4,093,307

A vehicle safety belt structure for use with a seat having a back, in which two laterally extending straps are attached to a body portion and extend around the passenger. The body portion is supported on the back of the vehicle seat and the straps are so positioned with respect to an adult passenger that they overlap the lower rib cage and the upper abdomen and give support to the body while restraining the passenger in the event of a sudden stop or accident. The two straps are preferably connected to one another around the body of the passenger by a Velcro fastener, and an upper portion attached to the body may be secured to the upper part of the back by a fixture which permanently holds the belt structure in place on the back of the set. The safety belt structure gives a firm support to the body without holding or cramping the hips, lower back and upper part of the legs of the passenger in a firm position, and my be positioned on the passenger to provide, in effect, a lifting action or supporting effect to the mid and upper body portion of the passenger.

HUNT, EVELYN E.

VEHICLE PROTECTION DEVICE

U.S. Pat. No. 4,723,814

A vehicle seat protection device, for protecting a seat having a back, consists of a loose seat cover attached to an elongate member. The elongate member has fixing means for fixing the member in proximity to the upper edge of the seat back. The elongate member also has means for detachably connecting the seat cover thereto.

WALLACE, WALTER H.

WALLACE, BEATRICE

VEHICLE SEAT PROTECTOR FOR TRANSPORTING ANIMALS

U.S. Pat. No. 4,969,683

A cushioned seat protector of resilient material has a protective fabric covering and is removably installed on existing vehicle seats for transporting pets and animals. The seat protector has a generally rectangular seat portion configured to substantially cover and be supported on the seat member of the existing vehicle seat and a generally rectangular back portion configured to substantially cover and be supported against the backrest member of the vehicle seat. A generally rectangular tail portion extends rearwardly from the adjacent longitudinal edges of the back portion and seat portion to be tucked into the gap between the seat member and backrest member of the existing vehicle seat to removably secure the seat protector on the existing vehicle seat. Straps may be provided on the seat protector back portion to be secured to a portion of the backrest member of the existing vehicle seat to removably secure the seat protector back portion against the existing vehicle seat backrest member. The soft resilient material on the bottom surfaces of the seat portion and back portion is exposed to frictionally engage the existing vehicle seat member and back member surfaces to reduce sliding of the seat protector on the existing seat surfaces when the weight of the animal is supported thereon. The seat protector provides a comfortable ride for the pet and prevents damage to the existing vehicle seat upholstery caused by the pet's claws or soiling of the upholstery by dirty pets.

DRUM, THOMAS T.

VEHICLE SEAT COVER

U.S. Pat. No. 5,403,066

An improved seat cover for use with automobile, truck or other type vehicle seats for improved comfort, heat reduction and to avoid user perspiration. The seat cover includes reversible terrycloth fabric sheets that include a foam padding disposed therebetween. The foam padding is separated by individual longitudinal chambers. The seat cover includes a plurality of mounting straps firmly connecting the seat cover to the vehicle seat by flexible, stretchable bungee cords. The seat cover includes a plurality of lateral and longitudinal rods that ensure form and configuration stability. A very thin foam cell sheet is used between the outer portions of the seat cover and vehicle seat to prevent lateral movement of the seat cover.

SUMMARY OF THE INVENTION

A primary object of the present invention is to provide a seat protector that will overcome the shortcomings of the prior art devices.

Another object is to provide a seat protector that can be secured in a removable manner to a backrest of a driver's seat in a motor vehicle, to protect the backrest from excessive use and wear by a person wearing a utility belt with specialized equipment.

An additional object is to provide a seat protector than when properly installed to cover only a specific wear portion of the backrest, it will possibly last the life of the motor vehicle, without the need of repair or reupholstery of the backrest of the driver's seat.

A further object is to provide a seat protector that is simple and easy to use.

A still further object is to provide a seat protector that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 4 is a rear perspective view taken in the direction of arrow 4 in FIG. 1.

FIG. 5 is a front perspective view taken in the direction of arrow 5 in FIG. 4, with parts broken away and the backrest and seat shown in phantom.

Similar reference characters denote corresponding features consistently throughout the attached drawings.

DETAILED DESCRIPTION OF THE PREFERRED EMBODIMENTS

Figure 1:
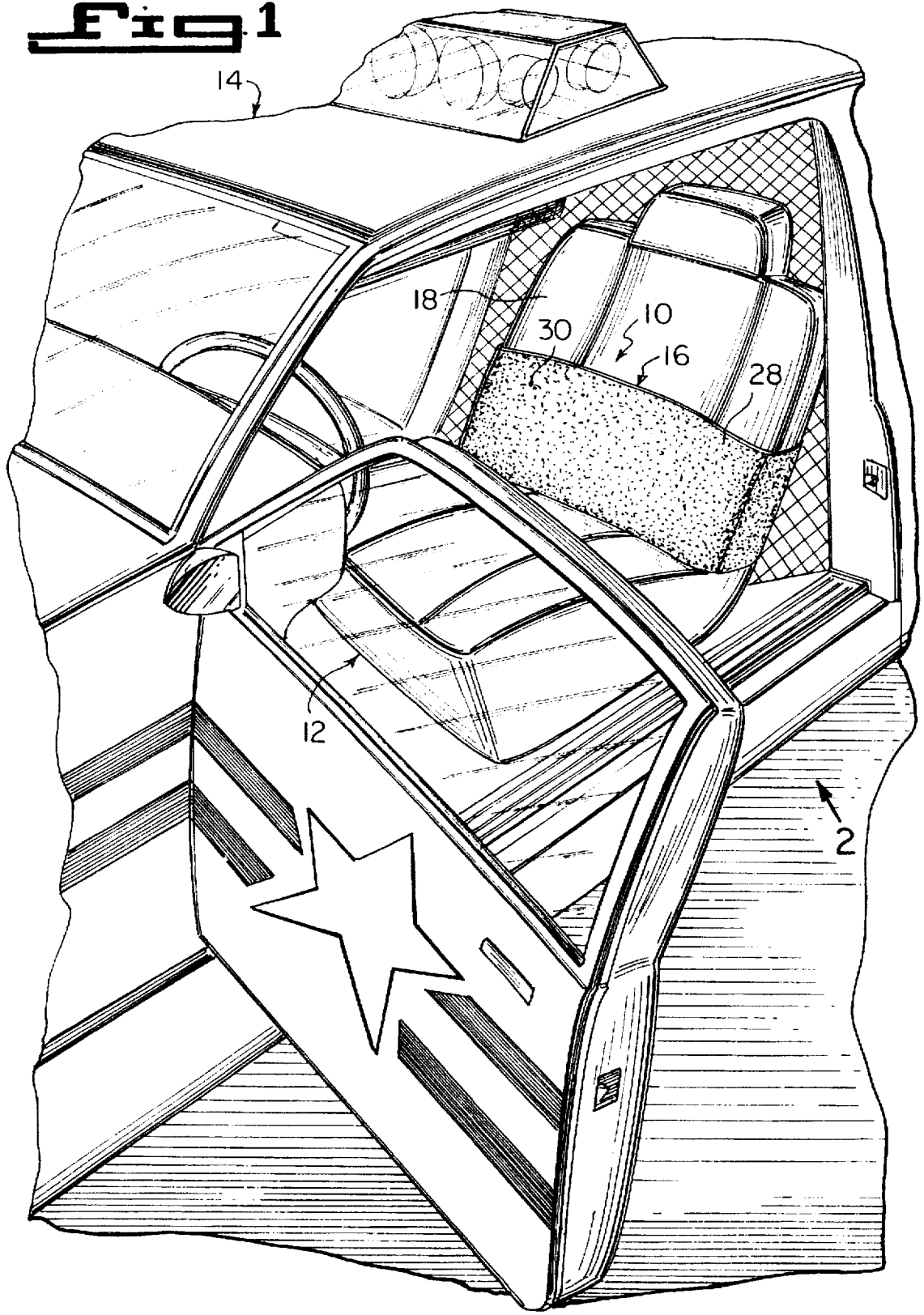
FIG. 1 is a front perspective view of a motor vehicle with parts broken away, showing the instant invention installed on a backrest of the driver's seat.
Figure 2:
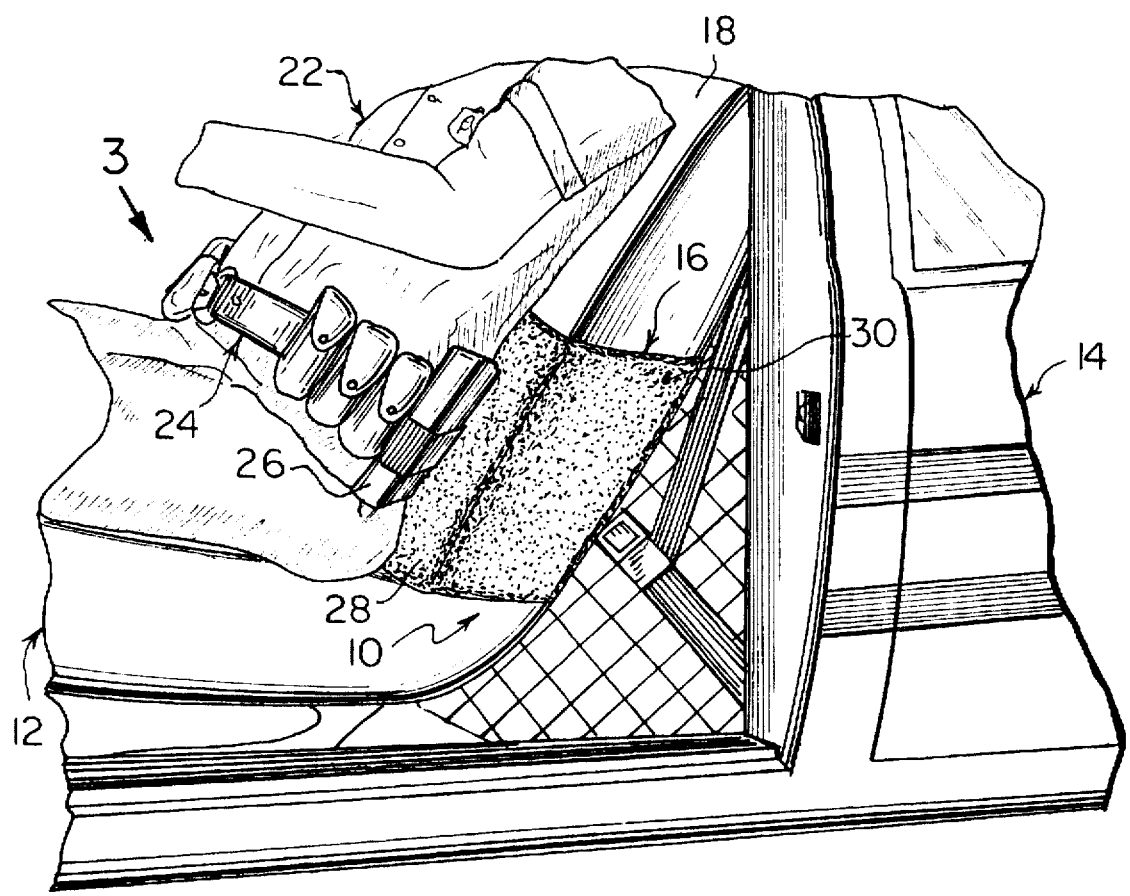
FIG. 2 is a side perspective view taken in the direction of arrow 2 in FIG. 1, showing a person wearing a utility belt sitting in the driver's seat.
Figure 3:
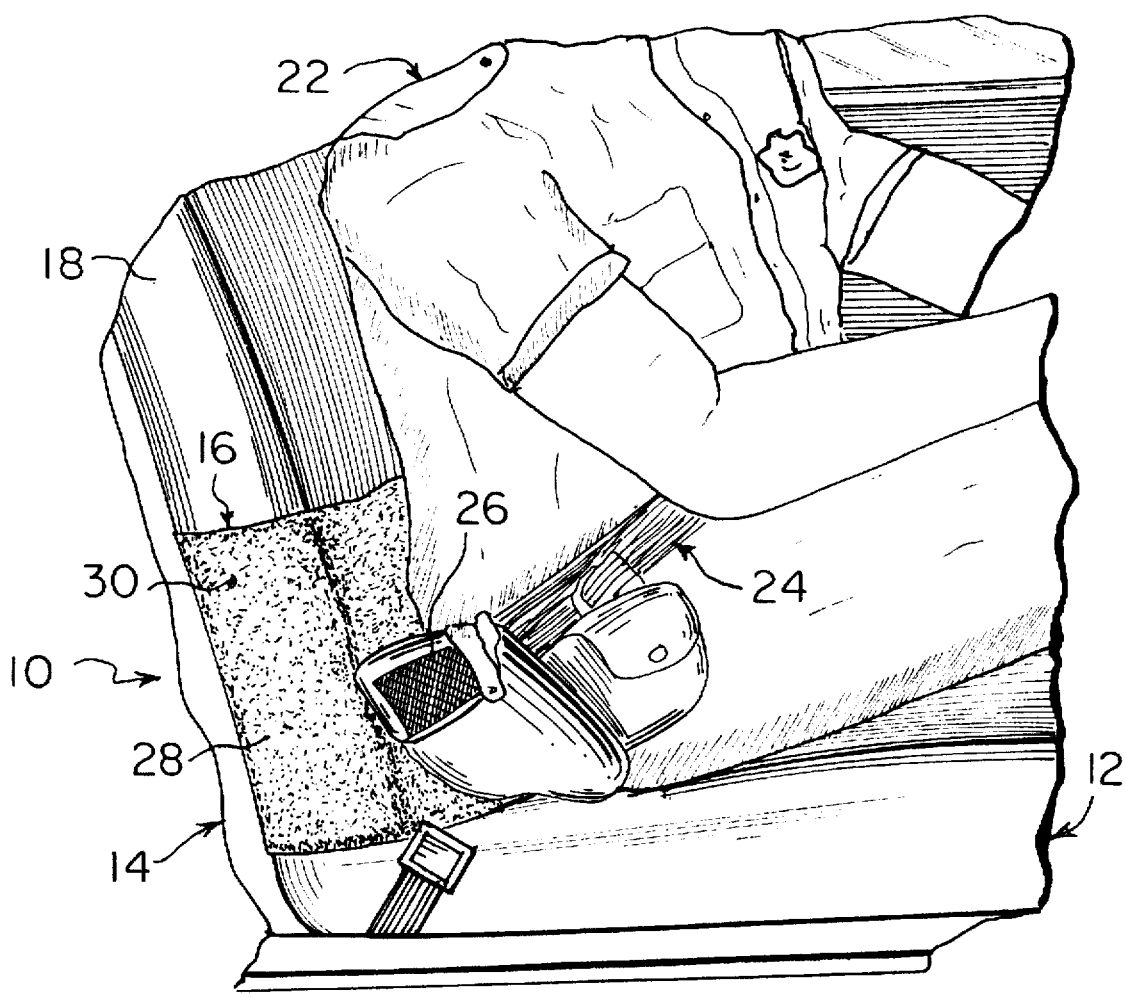
FIG. 3 is a side perspective view from an opposite side taken in the direction of arrow 3 in FIG. 2.

Turning now descriptively to the drawings, in which similar reference characters denote similar elements throughout the several views, FIGS. 1 through 5 illustrate a seat protector 10 for a driver's seat 12 in a motor vehicle 14 comprising a flexible sheet 16 to fit against a lower portion of a backrest 18 of the driver's seat 12 in a motor vehicle 14. A structure 20 is for installing and adjusting the flexible sheet 16 against the lower portion of the backrest 18 of the driver's seat 12, so as to protect the backrest 18 from excessive use and wear by a person 22 wearing a utility belt 24 with specialized equipment 26 sitting in the driver's seat 12.

The flexible sheet 16 is a rectangular shaped piece of pliable material 28 having approximately the same area as the lower portion of the backrest 18 of the driver's seat 12 in the motor vehicle 14 to which it is to be applied to protect. The flexible sheet 16 is constructed of a six to eight ounce piece of vegetable tanned leather 30. The piece of leather 30 is approximately twelve inches wide by thirty inches long. The piece of leather 30 is wet molded, dried and then cut to shape for neatness.

The installing and adjusting structure 20, as shown in FIGS. 4 and 5, includes a pair of straps 32. Four VELCRO loop fastener pads 34 to provided. Two of the VELCRO loop fastener pads 34 are each attached to opposite ends of each strap 32. Two VELCRO hook fastener strips 36 are also provided. Each VELCRO hook fastener strip 36 is attached to an inner surface of an opposite end of the flexible sheet 16. The VELCRO loop fastener pads 34 can engage in an adjustable manner with the VELCRO hook fastener strips 36, to hold the flexible sheet 16 in a stationary position against the lower portion of the backrest 18 of the driver's seat 12 in a motor vehicle 14.

Each strap 32 is fabricated out of a nylon webbing seat belt material 38. Each strap 32 is approximately thirty five inches in length and two inches wide. Each VELCRO loop fastener pad 34 is attached to an end of each strap 32 by being sewn thereto at 40. Each VELCRO hook fastener strip 36 is attached to the inner surface of an end of the flexible sheet 16 from top to bottom by being sewn thereto at 42.

OPERATION OF THE INVENTION

To use the seat protector 10, the following steps should be taken:

1. Put the backrest 18 of the driver's seat 12 to its fullest upright position.
2. Engage the VELCRO loop fastener pads 34 on the straps 32 in spaced apart top and bottom parallel transverse relationships to the VELCRO hook fastener strips on the flexible sheet 16.
3. Slip the flexible sheet 16 with the attached straps 32 over the backrest 18 of the driver's seat 12.
4. Adjust the flexible sheet 16 on the lower portion of the backrest 18 until it reaches the driver's seat 12.
5. The person 22 wearing the utility belt 24 with the specialized equipment 26 can safely sit upon the driver's seat 12 and not damage or wear out the backrest 18.

LIST OF REFERENCE NUMBERS 10 seat protector for 12
12 driver's seat in 14
14 motor vehicle
16 flexible sheet of 10
18 backrest of 12
20 installing and adjusting structure of 10 for 16
22 person
24 utility belt on 22
26 specialized equipment in 24
28 pliable material for 16
30 piece of vegetable tanned leather for 16
32 strap of 20
34 VELCRO loop fastener pad of 20 on 32
36 VELCRO hook fastener strip of 20 on 16
38 nylon webbing seat belt material of 32
40 sewing of 34 on 32
42 sewing of 36 on 16

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A seat protector for, and in combination with, a driver's seat in a motor vehicle comprising:

a) a flexible sheet mounted against a lower portion of a backrest of the driver's seat in the motor vehicle, said flexible sheet consisting of a solid flexible member on the front of said seat with a lower edge of said sheet along the bottom of said backrest and wrapped around the sides of said backrest with a pair of side edges aligned with the rear of said backrest and said flexible sheet being a rectangular shaped piece of pliable material having approximately the same area as the lower portion of the backrest to which it is to be applied to protect; and b) means for installing and adjusting said flexible sheet against the lower portion of the backrest of the driver's seat comprising hook or loop fasteners along and inside the top and bottom edges of said flexible sheet adjacent the side edges of said flexible sheet, a pair of straps extending along the back of said backrest joining the top and bottom side edges of said flexible sheet, said straps having hook or loop fasteners on the side away from said backrest engaged with the matching hook or loop fasteners on the inside of said flexible sheet, so as to protect the backrest from excessive use and wear by a person wearing a utility belt with specialized equipment sitting in the driver's seat.

2. A seat protector as recited in claim 1, wherein said flexible sheet is constructed of a six to eight ounce piece of vegetable tanned leather.

3. A seat protector as recited in claim 2, wherein said piece of leather is approximately twelve inches wide by thirty inches long.

4. A seat protector as recited in claim 2, wherein said piece of leather is wet molded, dried and then cut to shape for neatness.

* * * * *